Nov. 19, 1963         A. M. STOTT ETAL         3,111,293
SEAT POSITIONING DEVICE

Filed July 27, 1962                                2 Sheets-Sheet 1

INVENTORS
ALBERT M. STOTT
CHARLES J. LITZ, JR.
BY
ATTORNEYS

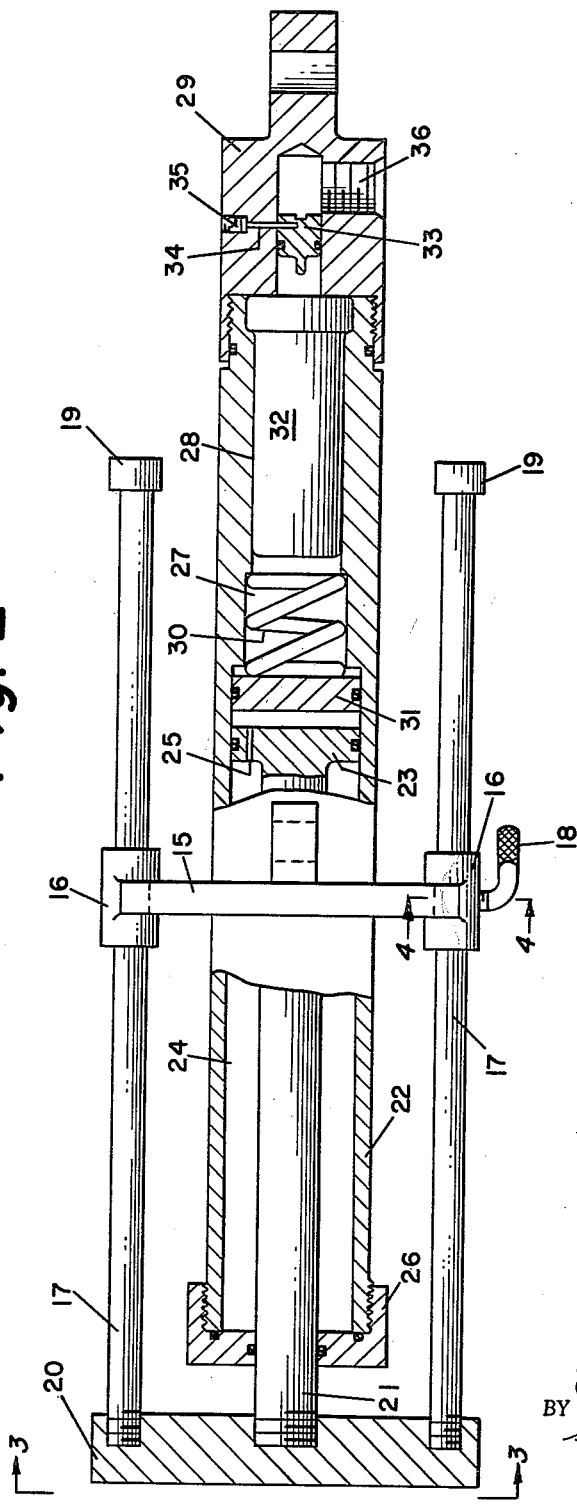

3,111,293
SEAT POSITIONING DEVICE
Albert M. Stott, Aldan-Clifton Heights, and Charles J. Litz, Jr., Philadelphia, Pa., assignors to the United States of America as represented by the Secretary of the Army
Filed July 27, 1962, Ser. No. 213,072
2 Claims. (Cl. 244—122)
(Granted under Title 35, U.S. Code (1952), sec. 266)

The invention described herein may be manufactured and used by or for the Government or governmental purposes without the payment to us of any royalty thereon.

This invention relates to devices for positioning the seat of an aircraft traveler prior to his ejection from a disabled aircraft.

As stated in a copending application of Gilbert H. Skopp and Charles J. Litz, Jr. Serial No. 89,077, filed February 13, 1961 for "Load Positioning Device," now Patent No. 3,077,325, various types of cartridge actuated devices are presently available for effecting the various motions incident to the operation of an aircraft escape system. The device of the copending application is distinguished from previously known devices in that it allows manual positioning of the seat both before and after the seat has been positioned by the application of a gas pressure. The present invention accomplishes this same result in an improved manner and by a device which is less complicated in its structure and operation.

The invention will be better understood from the following description when considered in connection with the accompanying drawings and its scope is indicated by the appended claims.

Referring to the drawings:

FIG. 2 is a horizontal section taken on the line 2—2 of FIG. 1,

Figure 1:
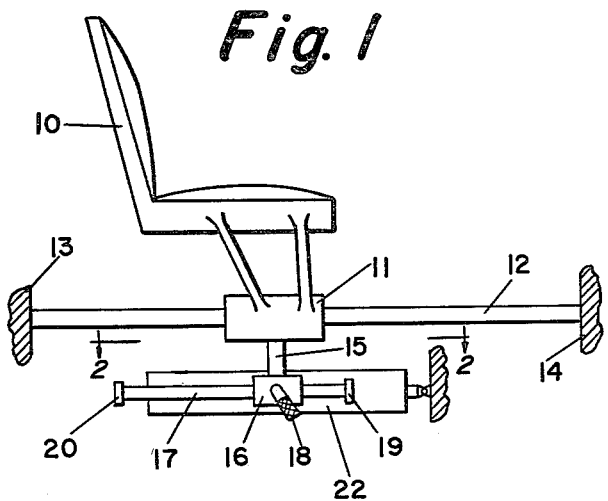
FIG. 1 is a side view of the seat positioning device.
Figure 3:
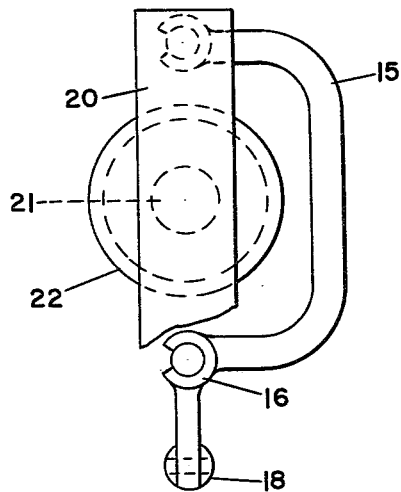
FIG. 3 is an end view of the device as viewed along the line 3—3 of FIG. 2.

FIG. 1 shows a seat 10 as fixed to a collar 11 which is movable along a rail 12 having stops 13 and 14 at its opposite ends. Also fixed to the collar 11 is a member 15 which has at its opposite ends collars 16. The collars 16 fit over outriggers 17, are movable therealong, and are adapted to be clamped thereto by means of a handle 18. The outriggers 17 have stops 19 at one end and are fixed together at the other end by a bar 20.

The bar 20 is fixed to a rod 21 which extends into a cylinder 22 and has at its inner end a piston 23. The cylinder 22 incloses a damping fluid 24, such as oil, and the plunger rod piston 23 has a perforation 25.

Figure 4:
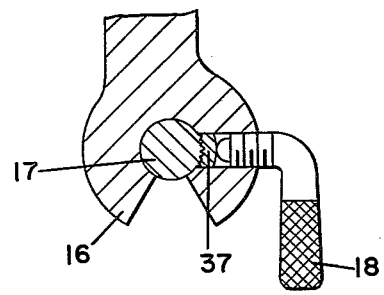
FIG. 4 is a sectional view taken on the line 4—4 of FIG. 2.

The cylinder 22 has (1) an end cap 26 through which the rod 21 extends, (2) has intermediate reduced sections 27 and 28, and (3) has a head 29. A spring 30 seated in the reduced section 27 biases a floating piston 31 against the damping fluid 24, and the reduced section 28 encloses a cartridge 32. The mechanism for firing the cartridge 32 is located in the head 29. It includes a firing pin 33 which is fixed to the head 29 by a shear pin pin 34, a screw 35 backing up the shear pin, and a gas inlet 36. As shown more clearly in FIG. 4, the means for coupling the member 15 to the outriggers 17 and uncoupling it therefrom includes the handle 18 which is threaded into the collar 16 and is adapted to force a jam block 37 against the outrigger.

In considering the operation of the device, it is to be remembered that the head 29 is fixed to the aircraft and that the seat 10 is movable manually along the rail 12 when the handle 18 is loosened. When the handle is tightened, however, the seat is fixed to the outrigger 17 and can be moved along the rail 12 only by a gas pressure generated upon the firing of the cartridge 32.

Cartridge operation of the device is initiated by a gas pressure applied through the inlet 36 to the firing pin 33. This pressure shears the shear pin 34 and drives the firing pin against the primer of the cartridge, thereby firing the cartridge and generating a gas pressure which is applied to the floating piston 31. This pressure is transmitted through the floating piston to the damping fluid 24, and is distributed equally on both sides of the plunger rod piston 23. Due to the area differential at the opposite sides of the piston 23, however, the damping fluid on the rod side of the piston 23 is subject to the greatest pressure. Consequently damping fluid flows through the orifice 25 and the piston completes its stroke with the damping fluid flowing through the orifice and producing the necessary velocity damping due to the buffing of the damping fluid.

Cartridge operation of the device may be effected with the seat positioned at various locations along the rail 12. The forward motion of the seat prior to cartridge operation has in effect partially positioned the seat. The thruster then only has to move the seat through a distance equal to the total stroke less the distance through which it has been adjusted manually. The thruster then completes a partial stroke and is stopped by the stop 13 on the rail 12. The spring 30 functions to permit expansion as required due to temperature change of the damping fluid 24.

The hydraulic damping device formed by the damping fluid 24, the rod 21 and the piston 23 functions to absorb linear energy thereby assuring a constant uniform stroke, preventing a large impact force at the end of the stroke, and terminating with a partial lock shut effect. As is customary in devices of this character, seal rings are provided between adjacent surfaces of the various parts.

We claim:

1. In a seat positioning device, the combination of a cylindrical member having at one end a cap and at the other end a head, said cylindrical member having adjacent said cap a first end section enclosing a damping fluid, having adjacent said head a second end section forming a firing chamber and having between said end sections an intermediate section of an internal diameter less than that of said first end section and greater than that of said firing chamber, a perforated piston movable in said first end section and fixed to a rod extending through said cap, a floating piston movable in said first end section, resilient means located in said intermediate section and urging said floating piston against said damping fluid, a pair of outriggers fixed to said rod, a rail, a seat movable along said rail, and means for detachably fixing said seat to said outriggers.

2. A device according to claim 1 wherein said head forms a guideway for firing pin fixed thereto by a shear pin and provides a gas inlet to the rear of said firing pin.

References Cited in the file of this patent
UNITED STATES PATENTS

| | | |
|---|---|---|
| 2,815,008 | Hirt | Dec. 3, 1957 |
| 2,873,726 | Stott | Feb. 17, 1959 |
| 3,077,325 | Skopp et al. | Feb. 12, 1963 |